United States Patent
Meng

(10) Patent No.: US 9,496,990 B2
(45) Date of Patent: Nov. 15, 2016

(54) METHOD OF REMAPPING HYBRID AUTOMATIC REPEAT REQUEST TIMELINE IN TIME DIVISION DUPLEX UPLINK-DOWNLINK RECONFIGURATION

(71) Applicant: HTC Corporation, Taoyuan County (TW)

(72) Inventor: Ling-San Meng, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 389 days.

(21) Appl. No.: 14/157,452

(22) Filed: Jan. 16, 2014

(65) Prior Publication Data
US 2014/0198690 A1 Jul. 17, 2014

Related U.S. Application Data

(60) Provisional application No. 61/753,877, filed on Jan. 17, 2013.

(51) Int. Cl.
*H04L 1/18* (2006.01)
*H04J 3/16* (2006.01)

(52) U.S. Cl.
CPC ........... *H04L 1/1854* (2013.01); *H04L 1/1812* (2013.01); *H04L 1/1822* (2013.01); *H04J 3/1694* (2013.01)

(58) Field of Classification Search
CPC ................. H04L 1/1812; H04L 1/1854; H04L 1/1822; H04J 3/1694; H04J 3/00
USPC .......................................................... 370/280
See application file for complete search history.

(56) References Cited

U.S. PATENT DOCUMENTS

| | | | |
|---|---|---|---|
| 2013/0194980 A1* | 8/2013 | Yin ........................ | H04L 1/1854 370/280 |
| 2013/0272169 A1* | 10/2013 | Wang ................ | H04W 72/0446 370/280 |
| 2014/0010128 A1* | 1/2014 | He .......................... | H04W 4/06 370/280 |
| 2014/0086112 A1* | 3/2014 | Stern-Berkowitz | H04W 72/1289 370/280 |

OTHER PUBLICATIONS

3GPP TR 36.828 V11.0.0, 3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11), Jun. 2012.

(Continued)

*Primary Examiner* — Habte Mered
*Assistant Examiner* — Rownak Islam
(74) *Attorney, Agent, or Firm* — Winston Hsu; Scott Margo

(57) ABSTRACT

A method of remapping Hybrid Automatic Repeat Request (HARQ) timeline in Time Division Duplex (TDD) uplink-downlink (UL-DL) reconfiguration, for a communication device in a wireless communication system is disclosed. The method includes being reconfigured from a first TDD UL-DL configuration in a first radio frame to a second TDD UL-DL configuration in a second radio frame, determining a TDD UL-DL reference configuration according to UL subframe allocations of the first and second TDD UL-DL configurations in the first radio frame, and performing HARQ processes of the first TDD UL-DL configuration according to a HARQ timeline of the TDD UL-DL reference configuration during the first and second radio frames.

8 Claims, 8 Drawing Sheets

| TDD UL/DL Configuration | 0 | 1 | 2 | 3 | 4 | 5 | 6 |
|---|---|---|---|---|---|---|---|
| 0 | 0 | 0 | 0 | 0 | 0 | 0 | 0 |
| 1 | | 1 | 1 | 6 | 1 | 1 | 6 |
| 2 | | | 2 | 6 | 1 | 2 | 6 |
| 3 | | | | 3 | 3 | 3 | 6 |
| 4 | | | | | 4 | 4 | 6 |
| 5 | | | | | | 5 | 6 |
| 6 | | | | | | | 6 |

(56) References Cited

OTHER PUBLICATIONS

3GPP TS 36.213 V11.0.0, 3rd Generation Partnership Project; Technical Specification Group Radio Access Network; Evolved Universal Terrestrial Radio Access (E-UTRA); Physical layer procedures (Release 11), Sep. 2012.

\* cited by examiner

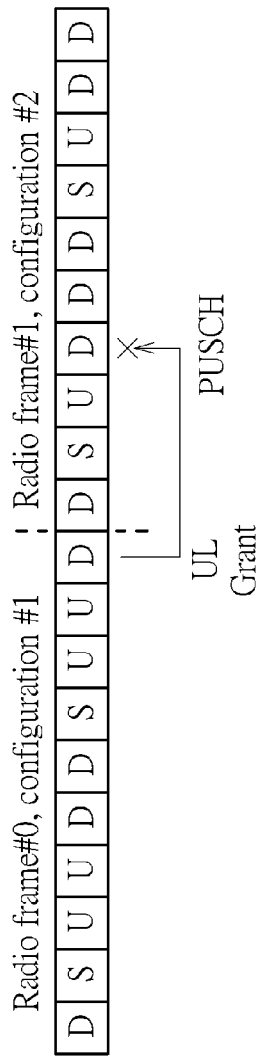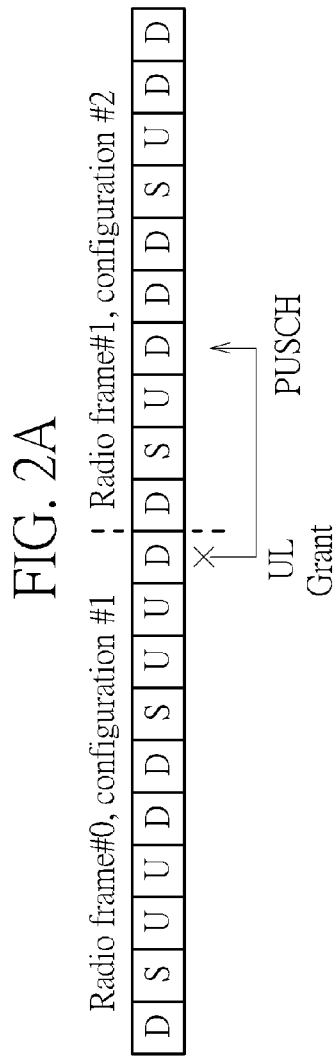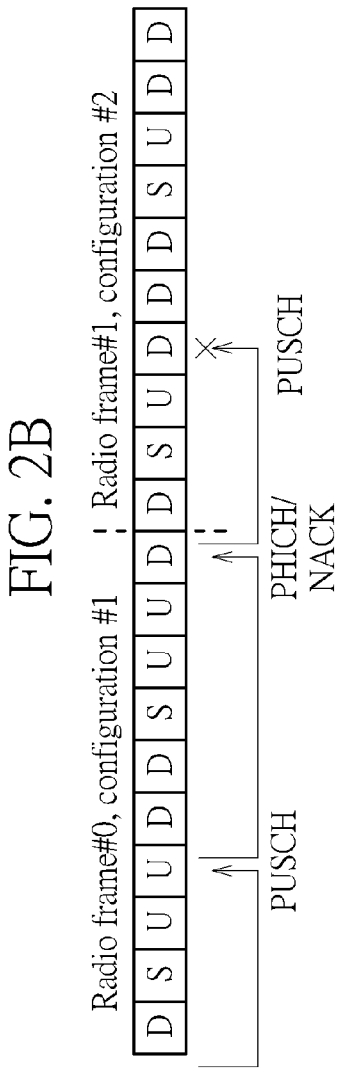
FIG. 2A
FIG. 2B
FIG. 2C

| TDD UL/DL Configuration | 0 | 1 | 2 | 3 | 4 | 5 | 6 |
|---|---|---|---|---|---|---|---|
| 0 | 0 | 0 | 0 | 0 | 0 | 0 | 0 |
| 1 |   | 1 | 1 | 6 | 1 | 1 | 6 |
| 2 |   |   | 2 | 6 | 1 | 2 | 6 |
| 3 |   |   |   | 3 | 3 | 3 | 6 |
| 4 |   |   |   |   | 4 | 4 | 6 |
| 5 |   |   |   |   |   | 5 | 6 |
| 6 |   |   |   |   |   |   | 6 |

FIG. 7

(54) METHOD OF REMAPPING HYBRID AUTOMATIC REPEAT REQUEST TIMELINE IN TIME DIVISION DUPLEX UPLINK-DOWNLINK RECONFIGURATION

CROSS REFERENCE TO RELATED APPLICATIONS

This application claims the benefit of U.S. Provisional Application No. 61/753,877, filed on Jan. 17, 2013 and entitled "Method and Apparatus for HARQ Timeline Remapping for TDD Systems with Dynamic Traffic Adaptation", the contents of which are incorporated herein in their entirety.

BACKGROUND OF THE INVENTION

1. Field of the Invention

The present invention relates to a method used in a communication device in wireless communication system, and more particularly, to a method of remapping HARQ timeline in TDD configuration change.

2. Description of the Prior Art

Time division duplex (TDD) offers flexible deployments without requiring a pair of spectrum resources. Currently, LTE TDD allows for asymmetric uplink-downlink (UL-DL) subframe allocations by providing seven different TDD UL-DL configurations. The TDD UL-DL configuration may or may not match the instantaneous traffic situation. Thus, the current mechanism provides TDD UL-DL reconfiguration for traffic adaptation. It has been shown that the average cell throughput can be improved to a large extent by allowing traffic adaptation in LTE TDD system.

Hybrid automatic repeat request (HARQ) is a transmission technique widely adopted in modern wireless communication systems. HARQ operates by retransmitting an identical copy of the original transmission or another redundancy version upon transmission error. The receiver then combines the previously corrupted transmissions with the retransmitted one. In LTE TDD systems, the timing relation between the feedback information indicating a transmission error and the corresponding retransmission are separately and differently defined for each of the seven configurations due to the different allocations of the UL-DL subframes (referring to FIG. 1, which illustrates a schematic diagram of HARQ timelines of TDD UL-DL configurations in the LTE system).

However, the applicant notices a problem of HARQ timeline mismatch due to the TDD reconfiguration since the HARQ timeline is dependent on the adopted TDD UL-DL configuration. In other words, dynamic switching among different TDD UL-DL configurations gives rise to HARQ timeline mismatches, especially for the UL case due to the constraint of synchronous HARQ operations. Such a mismatch problem could severely affect the transmission performance and degrade the achievable performance gain brought by the dynamic TDD traffic adaptation.

Please refer to FIG. 1, the HARQ timing relations are separately and differently defined for each of the seven TDD UL-DL configurations. In the case of TDD reconfiguration, the HARQ timelines for the UL HARQ processes, i.e, the UL grant, PUSCH, and PHICH, could be interrupted due to the different numbers of DL/UL subframes and/or different allocations of the DL/UL subframes. For example, there are four UL HARQ processes in TDD UL-DL configuration #1 while there are only three UL HARQ processes in TDD UL-DL configuration #3. The problem of HARQ timeline mismatch thus arises when the system switches from TDD UL-DL configuration #1 to configuration #3, and vice versa.

Take examples associated to the HARQ timeline mismatch problem. Please refer to FIGS. 2A-2C and 3, which illustrate schematic diagrams of HARQ timeline mismatch due to TDD UL-DL reconfiguration. In FIG. 2A, a UE configured with TDD UL-DL configuration #1 in radio frame #0 is reconfigured with TDD UL-DL configuration #2 in radio frame #1. The UE received UL grant in subframe #9 of TDD UL-DL configuration #1 in radio frame #0 shall transmit a PUSCH in subframe #3 in radio frame #1 based on the HARQ timeline defined in TDD UL-DL configuration #1. However, the PUSCH transmission is mismatched since subframe #3 of TDD UL-DL configuration #2 in radio frame #1 is a DL subframe. In FIG. 2B, if a PUSCH transmission in subframe #3 of TDD UL-DL configuration #2 in radio frame #1 is successful, a UL grant shall be allocated in subframe #8 in radio frame #0 based on the HARQ timeline defined in TDD UL-DL configuration #2. However, it is impossible that the UE receives the UL grant in subframe #8 of TDD UL-DL configuration #1 in radio frame #0 since subframe #8 of TDD UL-DL configuration #1 in radio frame #0 is a UL subframe. In FIG. 2C, the UE transmits PUSCH in subframe #3 of TDD UL-DL configuration #1 in radio frame #0 and then receives PHICH/NACK in subframe #9 of TDD UL-DL configuration #1 in radio frame #0. Based on the HARQ timeline of TDD UL-DL configuration #1, the UE shall transmit PUSCH in subframe #3 of TDD UL-DL configuration #1 in radio frame #1. However, the PUSCH is mismatched since subframe #3 of TDD UL-DL configuration #2 in radio frame #1 is a DL subframe.

Similarly, in FIG. 3, the UE configured with a carrier with TDD UL-DL configuration #1 in radio frame #0 is reconfigured with TDD UL-DL configuration #3 in radio frame #1. The UE receives UL grant in subframe #4 of TDD UL-DL configuration #1 in radio frame #0, and then transmits PUSCH in subframe #8 of TDD UL-DL configuration #1 in radio frame #0. Based on the HARQ timeline of TDD UL-DL configuration #1, the UE shall receive PHICH in subframe #4 in radio frame #1. However, it is impossible that the UE receives PHICH in subframe #4 of TDD UL-DL configuration #2 in radio frame #1 since subframe #4 of TDD UL-DL configuration #2 in radio frame #1 is a UL subframe.

Therefore, there is a need to solve the HARQ timeline mismatch problems.

SUMMARY OF THE INVENTION

It is there for an objective to provide a method of remapping HARQ timeline in TDD UL-DL reconfiguration to solve the above problems.

The present invention discloses a method of remapping HARQ timeline in TDD UL-DL reconfiguration, for a communication device in a wireless communication system. The method includes being reconfigured from a first TDD UL-DL configuration in a first radio frame to a second TDD UL-DL configuration in a second radio frame, determining a TDD UL-DL reference configuration according to UL subframe allocations of the first and second TDD UL-DL configurations in the first radio frame, and performing HARQ processes of the first TDD UL-DL configuration according to a HARQ timeline of the TDD UL-DL reference configuration during the first and second radio frames.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 2A-2C illustrate schematic diagrams of HARQ timeline mismatch due to TDD UL-DL reconfiguration.

FIG. 7 is a TDD UL-DL reference configuration table according to the present disclosure.

DETAILED DESCRIPTION

Figure 4:
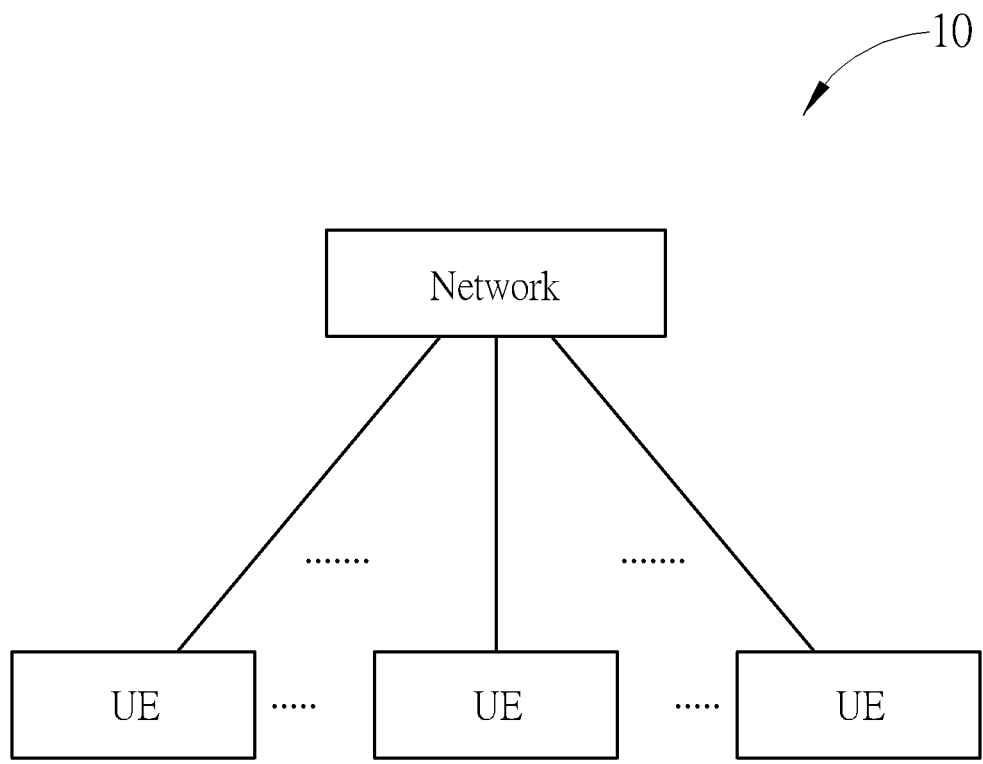
FIG. 4 illustrates a schematic diagram of an exemplary wireless communication system.

Please refer to FIG. 4, which is a schematic diagram of a wireless communication system 10. The wireless communication system 10 is a Long-Term Evolution (LTE) system or other mobile communication systems, and is briefly composed of a network and a plurality of user equipments (UEs). In FIG. 4, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 5:
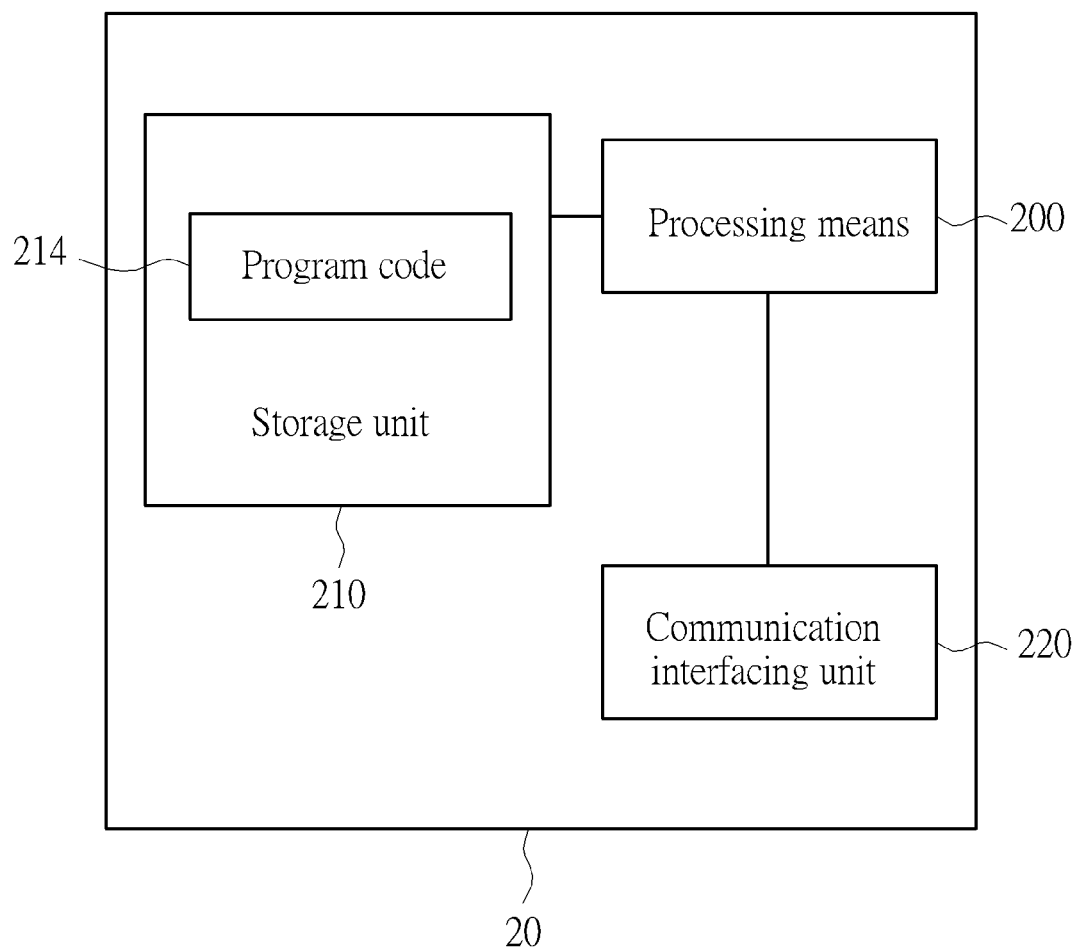
FIG. 5 illustrates a schematic diagram of an exemplary communication device.

FIG. 5 illustrates a schematic diagram of an exemplary communication device 20. The communication device 20 can be the UE shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 6:
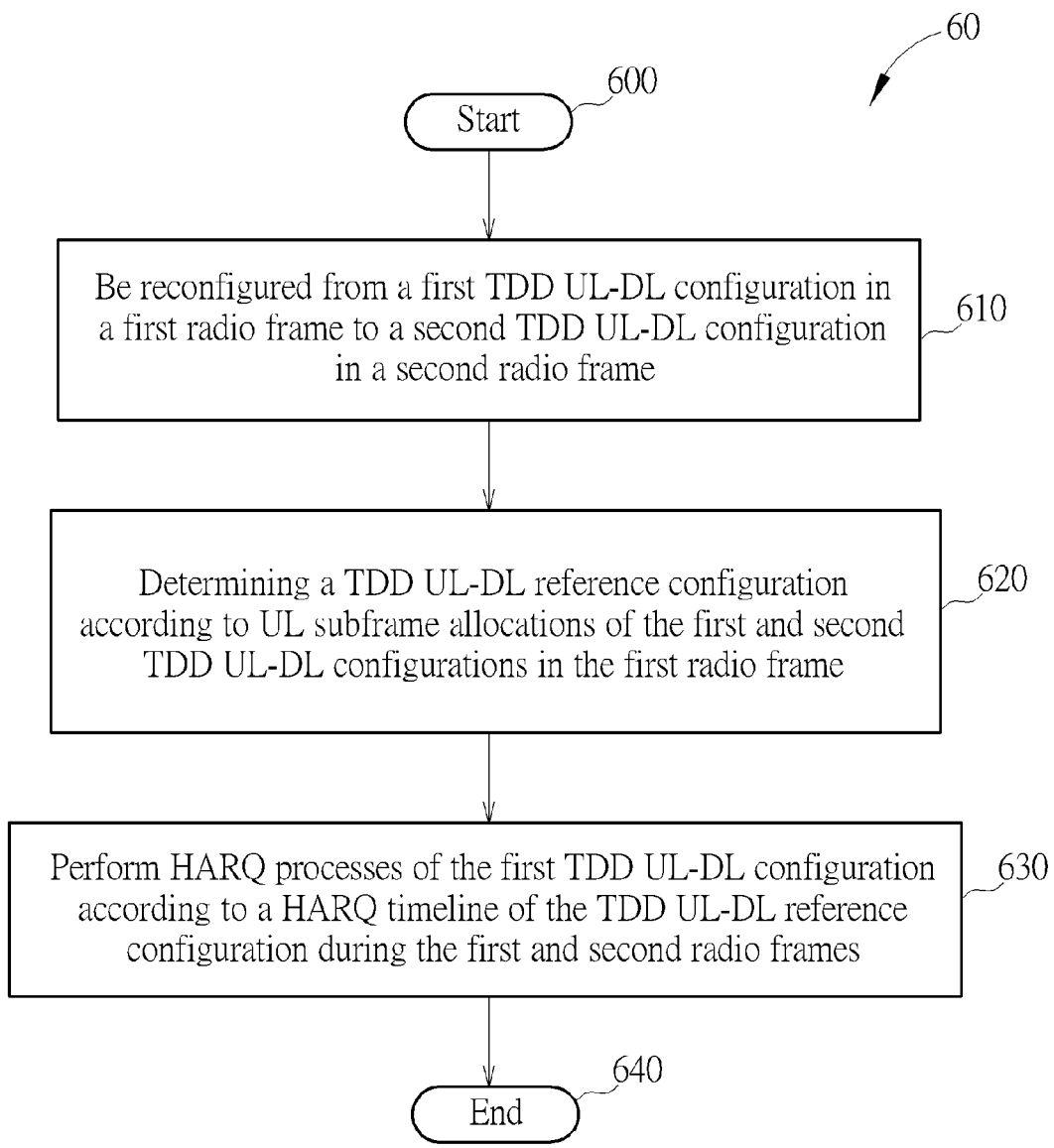
FIG. 6 is a flowchart of an exemplary process according to the present disclosure.

Please refer to FIG. 6, which is a flowchart of a process 60 according to an example of the present disclosure. The process 60 is utilized in the communication device 20 (i.e. a UE) for remapping HARQ timeline in TDD UL-DL reconfiguration. The process 60 may be compiled into a program code 214 to be stored in the storage unit 210, and may include the following steps:

Step 600: Start.

Step 610: Be reconfigured from a first TDD UL-DL configuration in a first radio frame to a second TDD UL-DL configuration in a second radio frame.

Step 620: Determining a TDD UL-DL reference configuration according to UL subframe allocations of the first and second TDD UL-DL configurations in the first radio frame.

Step 630: Perform HARQ processes of the first TDD UL-DL configuration according to a HARQ timeline of the TDD UL-DL reference configuration during the first and second radio frames.

Step 640: End.

According to the process 60, the UE configured with TDD UL-DL configuration A in radio frame n is reconfigured to TDD UL-DL configuration B in radio frame n+1. The TDD UL-DL reference configuration C is found by choosing the TDD configuration whose UL subframes constitute a superset of both the sets of UL subframes in TDD UL-DL configuration A and in configuration B in radio frame n and n+1, respectively. If there are multiple TDD UL-DL configurations fulfilling the aforementioned criterion, the TDD UL-DL configuration having the least number of UL subframes is chosen as the TDD UL-DL reference configuration. In addition, the HARQ processes started in radio frame n now follows the HARQ timeline defined for the TDD UL-DL reference configuration C in radio frame n and n+1. In other words, the PUSCH transmission in radio frame n now follows the timing defined for configuration C in radio frame n and n+1 instead of the original HARQ timing defined for configuration A in radio frame n and configuration B in radio frame n+1.

Based on the process 60, a method for remapping the different HARQ timelines between different TDD UL-DL configurations is clearly defined.

Figure 1:
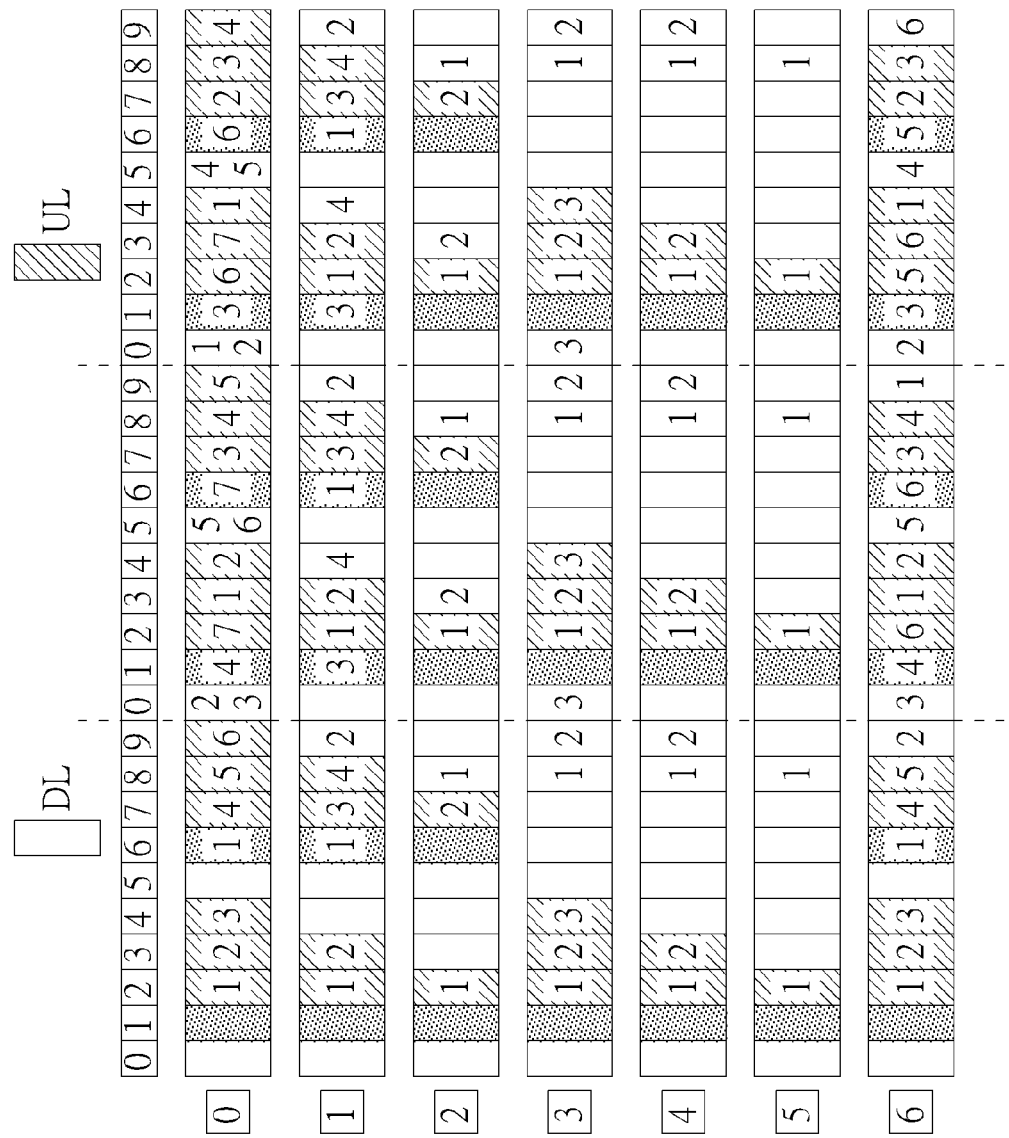
FIG. 1 illustrates a schematic diagram of HARQ timelines in TDD UL-DL configurations of LTE system.
Figure 3:
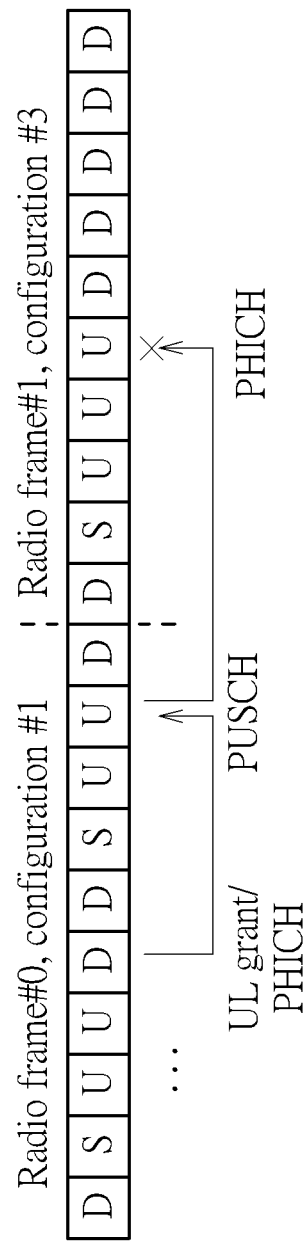
FIG. 3 illustrates a schematic diagram of HARQ timeline mismatch due to TDD UL-DL reconfiguration.

Take an example based on the process 60 for remapping the HARQ timelines between different TDD UL-DL configurations. Assume the TDD UL-DL configuration is changed from radio frame #0 with TDD UL-DL configuration #1 to radio frame #1 with TDD UL-DL configuration #3. In the first step, the UE finds TDD UL-DL reference configuration based on the UL subframe allocations of TDD UL-DL configuration #1 and #3 in radio frame #0. In detail, please refer back to FIG. 1. In FIG. 1, UL subframes are allocated in subframe '2', '3', '7' and '8' of TDD UL-DL configuration #1 in radio frame #0 and in subframe '2', '3' and '4' of TDD UL-DL configuration #3 in radio frame #1. In this embodiment, the UE selects a TDD UL-DL configuration which has all the UL subframes but the least number of the UL subframes. As can be seen, the TDD UL-DL configuration #0 includes UL subframes in '2', '3', '4', '7', '8' and '9', and the TDD UL-DL configuration #6 includes UL subframes in '2', '3', '4', '7' and '8'. Thus, the UE selects the TDD UL-DL configuration #6, which has the least number of UL subframes, as the TDD UL-DL reference configuration.

Based on the abovementioned method, the TDD UL-DL reference configuration table is constructed as shown in FIG. 7. Based on FIG. 7, if the UE configured with TDD UL-DL configuration #4 is reconfigured to TDD UL-DL configuration #5, the UE determines the TDD UL-DL configuration #4 as the TDD UL-DL reference configuration. In other embodiment, if the UE configured with TDD UL-DL configuration #2 is reconfigured to TDD UL-DL configuration #4, the UE determines the TDD UL-DL configuration #1 as the TDD UL-DL reference configuration.

Figure 8:
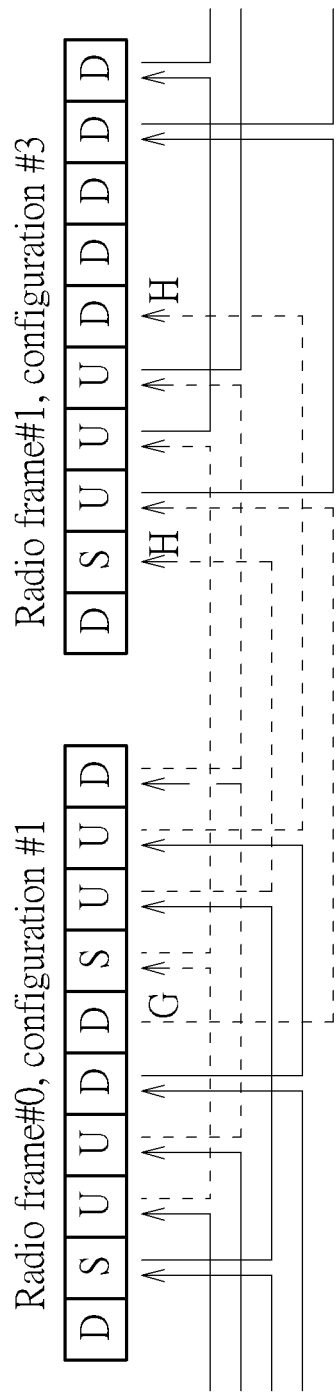
FIG. 8 illustrates a schematic diagram of an embodiment of remapping HARQ timeline in TDD UL-DL reconfiguration.

In the second step, the UE maps the HARQ processes started from radio frame #0 to radio frame #1 following the HARQ timeline defined for reference configuration #6 in radio frame #0 and #1. Please refer to FIG. 8, which illustrates a schematic diagram of an embodiment of remapping HARQ timeline in TDD UL-DL reconfiguration. In FIG. 8, UL subframe '2' of TDD UL-DL configuration #1 is corresponding to the UL subframe '2' of TDD UL-DL configuration #6 in radio frame #0, and thereby UL subframe '2' of TDD UL-DL configuration #6 is mapped to DL subframe '6' of TDD UL-DL configuration #6 in radio frame #0 (referring back to FIG. 1), and then mapped to UL subframe '3' of TDD UL-DL configuration #6 in radio frame #1. In this embodiment, since the UL subframe '3' of TDD UL-DL configuration #3 in radio frame #1, which corresponds to UL subframe '3' of TDD UL-DL configuration #6 in radio frame #1, is also a UL subframe, the UL subframe '2' of TDD UL-DL configuration #1 is successfully mapped to UL subframe '3' of TDD UL-DL configuration #3. Thus, the HARQ timeline of TDD UL-DL configuration #1 is successfully mapped to TDD UL-DL configuration #3 from radio frame #0 to radio frame #1.

Similarly, UL subframe '3' of TDD UL-DL configuration #1 which corresponding to the UL subframe '3' of TDD UL-DL configuration #6 in radio frame #0, and UL subframe '3' of TDD UL-DL configuration #6 is mapped to DL subframe '9' of TDD UL-DL configuration #6 in radio frame #0, and then mapped to UL subframe '4' of TDD UL-DL configuration #6 in radio frame #1. In this embodiment, since the UL subframe '4' of TDD UL-DL configuration #3 in radio frame #1, which corresponds to UL subframe '4' of TDD UL-DL configuration #6 in radio frame #1, is also a UL subframe, the UL subframe '3' of TDD UL-DL configuration #1 is successfully mapped to UL subframe '4' of TDD UL-DL configuration #3. Thus, the HARQ timeline of TDD UL-DL configuration #1 is successfully mapped to TDD UL-DL configuration #3 from radio frame #0 to radio frame #1.

In FIG. 8, UL subframe '7' of TDD UL-DL configuration #1 in radio frame #0 corresponding to the UL subframe '7' of TDD UL-DL configuration #6 in radio frame #0 is mapped to DL subframe '1' of TDD UL-DL configuration #6 in radio frame #1. Note that, based on the abovementioned concept, the DL subframe '1' of TDD UL-DL configuration #6 in radio frame #1 shall continuously map to subframe '8' of TDD UL-DL configuration #6 in radio frame #1. However, in this embodiment, since the subframe '8' of TDD UL-DL configuration #3 in radio frame #1, which corresponds to UL subframe '8' of TDD UL-DL configuration #6 in radio frame #1, is not a UL subframe, the UL subframe '7' of TDD UL-DL configuration #1 in radio frame #0 is successfully mapped to DL subframe '1' of TDD UL-DL configuration #3 in radio frame #1 only, and is stopped in DL subframe '1' of TDD UL-DL configuration #3 in radio frame #1.

Similarly, UL subframe '8' of TDD UL-DL configuration #1 in radio frame #0 corresponding to the UL subframe '8' of TDD UL-DL configuration #6 in radio frame #0 is mapped to DL subframe '5' of TDD UL-DL configuration #6 in radio frame #1. Note that, the DL subframe '5' of TDD UL-DL configuration #6 is terminated in radio frame #1. Thus, the UL subframe '8' of TDD UL-DL configuration #1 in radio frame #0 is successfully mapped to DL subframe '5' of TDD UL-DL configuration #3 in radio frame #1 only, and is stopped in DL subframe '5' of TDD UL-DL configuration #3 in radio frame #1.

Based on the TDD UL-DL reference configuration, the HARQ timeline can be mapped between different TDD UL-DL reference configurations in different radio frame.

Note that, in FIG. 8, there is a remaining UL subframe '2' of TDD UL-DL reference configuration #6 in radio frame #1. In an embodiment, a UL grant shall be allocated in DL subframe '5' of TDD UL-DL configuration #1 in radio frame #0.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, the present invention provides a clear definition for the HARQ timeline remapping during TDD UL-DL reconfiguration, so as to avoid HARQ timeline mismatch.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of remapping Hybrid Automatic Repeat Request (HARQ) timeline in Time Division Duplex (TDD) uplink-downlink (UL-DL) reconfiguration, for a communication device in a wireless communication system, comprising:
   being reconfigured from a first TDD UL-DL configuration in a first radio frame to a second TDD UL-DL configuration in a second radio frame on a carrier;
   determining a TDD UL-DL reference configuration according to UL subframe allocations of the first and second TDD UL-DL configurations in the first radio frame, wherein the TDD UL-DL reference configuration has the least number of UL subframes among all TDD UL-DL reference configurations which include all UL subframes both in the first and second TDD UL-DL configurations;
   performing HARQ processes of the first TDD UL-DL configuration according to a HARQ timeline of the TDD UL-DL reference configuration during the first and second radio frames on the carrier; and
   performing UL HARQ processes of the second TDD UL-DL configuration according to a HARQ timeline of the second TDD UL-DL configuration during the second radio frame on the carrier.

2. The method of claim 1, wherein performing HARQ processes of the first TDD UL-DL configuration according to a HARQ timeline of the TDD UL-DL reference configuration during the first and second radio frames comprises:
   determining whether a UL subframe of the TDD UL-DL reference configuration in the second radio frame mapped by a DL HARQ process of the first TDD UL-DL configuration in the first radio frame is a UL subframe of the second TDD UL-DL configuration in the second radio frame;
   determining whether a DL subframe of the TDD UL-DL reference configuration in the second radio frame mapped by a UL HARQ process of the first TDD UL-DL configuration in the first radio frame is a DL subframe of the second TDD UL-DL configuration in the second radio frame;

mapping the DL HARQ process of the first TDD UL-DL configuration in the first radio frame to the UL subframe of the second TDD UL-DL configuration in the second radio frame when determining the UL subframe of the TDD UL-DL reference configuration in the second radio frame is the UL subframe of the second TDD UL-DL configuration in the second radio frame; and mapping the UL HARQ process of the first TDD UL-DL configuration in the first radio frame to the DL subframe of the second TDD UL-DL configuration in the second radio frame when determining the DL subframe of the TDD UL-DL reference configuration in the second radio frame is the DL subframe of the second TDD UL-DL configuration in the second radio frame.

3. The method of claim 2, further comprising:
stopping the DL HARQ process of the first TDD UL-DL configuration in the first radio frame when determining the UL subframe of the TDD UL-DL reference configuration in the second radio frame is not the UL subframe of the second TDD UL-DL configuration in the second radio frame; and
stopping the UL HARQ process of the first TDD UL-DL configuration in the first radio frame when determining the DL subframe of the TDD UL-DL reference configuration in the second radio frame is not the DL subframe of the second TDD UL-DL configuration in the second radio frame.

4. The method of claim 1, further comprising:
being allocated a uplink grant in a DL subframe of the first TDD UL-DL configuration in the first radio frame according to the HARQ timeline of the TDD UL-DL reference configuration when a UL subframe of the TDD UL-DL reference configuration in the second radio frame is not mapped by a DL HARQ process of the first TDD UL-DL configuration in the first radio frame.

5. A mobile device of a wireless communication system for remapping Hybrid Automatic Repeat Request (HARQ) timeline in Time Division Duplex (TDD) uplink-downlink (UL-DL) reconfiguration comprising:
a processing means for executing a program; and
a storage unit coupled to the processing means for storing the program; wherein the program instructs the processing means to perform the following steps:
being reconfigured from a first TDD UL-DL configuration in a first radio frame to a second TDD UL-DL configuration in a second radio frame on a carrier;
determining a TDD UL-DL reference configuration according to UL subframe allocations of the first and second TDD UL-DL configurations in the first radio frame, wherein the TDD UL-DL reference configuration has the least number of UL subframes among all TDD UL-DL reference configurations which include all UL subframes both in the first and second TDD UL-DL configurations;
performing HARQ processes of the first TDD UL-DL configuration according to a HARQ timeline of the TDD UL-DL reference configuration during the first and second radio frames on the carrier; and performing UL HARQ processes of the second TDD UL-DL configuration according to a HARQ timeline of the second TDD UL-DL configuration during the second radio frame on the carrier.

6. The mobile device of claim 5, wherein performing HARQ processes of the first TDD UL-DL configuration according to a HARQ timeline of the TDD UL-DL reference configuration during the first and second radio frames comprises:
determining whether a UL subframe of the TDD UL-DL reference configuration in the second radio frame mapped by a DL HARQ process of the first TDD UL-DL configuration in the first radio frame is a UL subframe of the second TDD UL-DL configuration in the second radio frame;
determining whether a DL subframe of the TDD UL-DL reference configuration in the second radio frame mapped by a UL HARQ process of the first TDD UL-DL configuration in the first radio frame is a DL subframe of the second TDD UL-DL configuration in the second radio frame;
mapping the DL HARQ process of the first TDD UL-DL configuration in the first radio frame to the UL subframe of the second TDD UL-DL configuration in the second radio frame when determining the UL subframe of the TDD UL-DL reference configuration in the second radio frame is the UL subframe of the second TDD UL-DL configuration in the second radio frame; and
mapping the UL HARQ process of the first TDD UL-DL configuration in the first radio frame to the DL subframe of the second TDD UL-DL configuration in the second radio frame when determining the DL subframe of the TDD UL-DL reference configuration in the second radio frame is the DL subframe of the second TDD UL-DL configuration in the second radio frame.

7. The mobile device of claim 6, wherein the program further comprises the following steps:
stopping the DL HARQ process of the first TDD UL-DL configuration in the first radio frame when determining the UL subframe of the TDD UL-DL reference configuration in the second radio frame is not the UL subframe of the second TDD UL-DL configuration in the second radio frame; and
stopping the UL HARQ process of the first TDD UL-DL configuration in the first radio frame when determining the DL subframe of the TDD UL-DL reference configuration in the second radio frame is not the DL subframe of the second TDD UL-DL configuration in the second radio frame.

8. The mobile device of claim 5, wherein the program further comprises the following steps:
being allocated a uplink grant in a DL subframe of the first TDD UL-DL configuration in the first radio frame according to the HARQ timeline of the TDD UL-DL reference configuration when a UL subframe of the TDD UL-DL reference configuration in the second radio frame is not mapped by a DL HARQ process of the first TDD UL-DL configuration in the first radio frame.

* * * * *